(12) United States Patent
Hervey et al.

(10) Patent No.: US 6,231,206 B1
(45) Date of Patent: May 15, 2001

(54) FIBER-OPTIC LIGHTING DISPLAY

(75) Inventors: Lee Hervey; James V. Brennan, both of Columbus, OH (US)

(73) Assignee: NBBJ, LLC, Columbus, OH (US)

( * ) Notice: Subject to any disclaimer, the term of this patent is extended or adjusted under 35 U.S.C. 154(b) by 0 days.

(21) Appl. No.: 09/292,724

(22) Filed: Apr. 15, 1999

Related U.S. Application Data

(60) Provisional application No. 60/081,858, filed on Apr. 15, 1998.

(51) Int. Cl.[7] ............................................. F21S 8/00
(52) U.S. Cl. ............................ 362/153; 362/559; 40/565
(58) Field of Search ................................. 362/559, 153, 362/576; 40/547

(56) References Cited

U.S. PATENT DOCUMENTS

| | | | |
|---|---|---|---|
| 640,140 | * 12/1899 | Lloyd | 40/565 |
| 3,331,956 | * 7/1967 | Hough | 362/554 |
| 4,394,714 | * 7/1983 | Rote | 362/576 |
| 4,745,525 | * 5/1988 | Sheehy | 362/559 |
| 5,095,412 | * 3/1992 | French | 362/153 |
| 5,103,581 | * 4/1992 | Novak | 362/559 |
| 5,165,187 | * 11/1992 | Shahidi-Hamedani | 362/554 |
| 5,335,151 | * 8/1994 | Dahlberg | 362/153.1 |
| 5,647,658 | 7/1997 | Ziadi | 362/47 |
| 5,951,144 | * 9/1999 | Gavigan | 362/153 |

FOREIGN PATENT DOCUMENTS

2073930 * 10/1981 (GB) ..................................... 362/559

OTHER PUBLICATIONS

FiberStars, Fiber Optic Lighting Systems: An Overview, www.fiberstars.com/overview.html, Apr. 14, 1998.

FiberStars, Welcome To the World of Fiberstars, www.fiberstars.com/index.html, Apr. 14, 1998.

FiberStars, Welcome to Fiberstars', Commercial Lighting Web Page, www.fiberstars.com/comerciallight.html, Apr. 14, 1998.

FiberStars, Photos of Fiber Optic Lighting Installations, www.fiberstars.com/applications.html, Apr. 14, 1998.

* cited by examiner

Primary Examiner—Sandra O'Shea
Assistant Examiner—Hargobind S. Sawhney
(74) Attorney, Agent, or Firm—Standley & Gilcrest LLP

(57) ABSTRACT

The present invention is a fiber-optic floor lighting display which comprises an icon 20, an 30 interface, a light source not shown, and a fiber-optic cable 40. The icon is adapted to be walked on by pedestrian traffic. The icon has a top and a bottom, and it is adapted to transmit light. The interface is also adapted to transmit light. The interface has a top and a bottom, and the top of the interface is secured to the bottom of the icon. The icon and the interface are mounted in a terrazzo floor system. The fiber-optic cable has at least one optical fiber. The optical fiber has an entry end and an exit end. The entry end of the optical fiber is adapted to receive light from the light source, and the exit end of the optical fiber is secured to the bottom of the interface. The exit end of the optical fiber is adapted to project light from the light source through the interface and the icon.

16 Claims, 3 Drawing Sheets

FIBER-OPTIC LIGHTING DISPLAY

This application claims the benefit of U.S. Provisional Application No. 60/081,858, filed Apr. 15, 1998.

BACKGROUND AND SUMMARY OF THE INVENTION

The present invention relates generally to an illuminated display, and more particularly, to a fiber-optic lighting display. The present invention will be described primarily with regard to a fiber-optic floor lighting display. However, it should be recognized that the present invention is equally applicable to a lighting display for a wall, a ceiling, or any other similar type of architectural structure.

In general, fiber-optic lighting works by propagating light along an optical fiber. Other common names for an optical fiber include an optical waveguide, a light pipe, or a light guide. One end of the optical fiber receives light from a light source such as an illuminator. After the light enters the optical fiber, the optical fiber transmits the light along its length by internal reflection. The light then emerges from the other end of the optical fiber with only minimal loss.

Optical fibers are available in a variety of materials including plastic, glass, and combinations of these materials. Some variables considered in selecting the appropriate material include attenuation, bandwidth, the numerical aperture, the dimensions of the optical fiber, the desired flexibility of the optical fiber, the need to terminate the optical fiber in the field, the interface between the optical fiber and the light source, and the power and features of the light source. As compared to glass optical fibers, plastic optical fibers are generally more durable and lighter in weight. Moreover, plastic optical fibers may have a smaller bend radius than glass optical fibers, and plastic optical fibers may be more easily cut and terminated in the field than glass optical fibers.

A fiber-optic cable may include one or more optical fibers. If a fiber-optic cable includes a plurality of optical fibers, the optical fibers may be grouped into one or more fiber bundles. In addition, a fiber-optic cable may include an outer sheathing or jacket which protects the one or more optical fibers.

A number of illuminators are commercially available for specifically producing fiber-optic illumination. Although the light source may be any source adapted to project light into an optical fiber, commercial illuminators may use a reflector to efficiently focus light into an end of an optical fiber. In addition, commercial illuminators are available in different lamp types, lamp intensities, and color temperatures. In particular, metal halide lamps, quartz-halogen lamps, and tungsten-halogen lamps are three popular types of lamps for commercial illuminators. Moreover, commercial illuminators may be equipped with color-change wheels, remote controls, computerized controls, dimmers, infrared wavelength filters, and ultraviolet wavelength filters.

A preferred embodiment of the lighting display of the present invention comprises an icon, an interface, a light source, and a fiber-optic cable. The icon has a top and a bottom, and it is adapted to transmit light. The interface is also adapted to transmit light. The interface has a top and a bottom, and the top of the interface is secured to the bottom of the icon. The fiber-optic cable has at least one optical fiber. The at least one optical fiber has an entry end and an exit end. The entry end of the at least one optical fiber is adapted to receive light from the light source. On the other hand, the exit end of the at least one optical fiber is secured to the bottom of the interface. The exit end of the at least one optical fiber is adapted to project light from the light source through the interface and the icon.

In addition to the novel features and advantages mentioned above, other objects and advantages of the present invention will be readily apparent from the following descriptions of the drawings and preferred embodiments.

DETAILED DESCRIPTION OF PREFERRED EMBODIMENT(S)

The present invention is directed to a fiber-optic lighting display. In particular, the present invention provides a fiber-optic lighting display and a method for making a fiber-optic lighting display. A preferred embodiment of the lighting display may be mounted in a floor. However, it should also be recognized that a preferred embodiment of the lighting display may be mounted in a wall, a ceiling, or any similar type of architectural structure.

Figure 1:
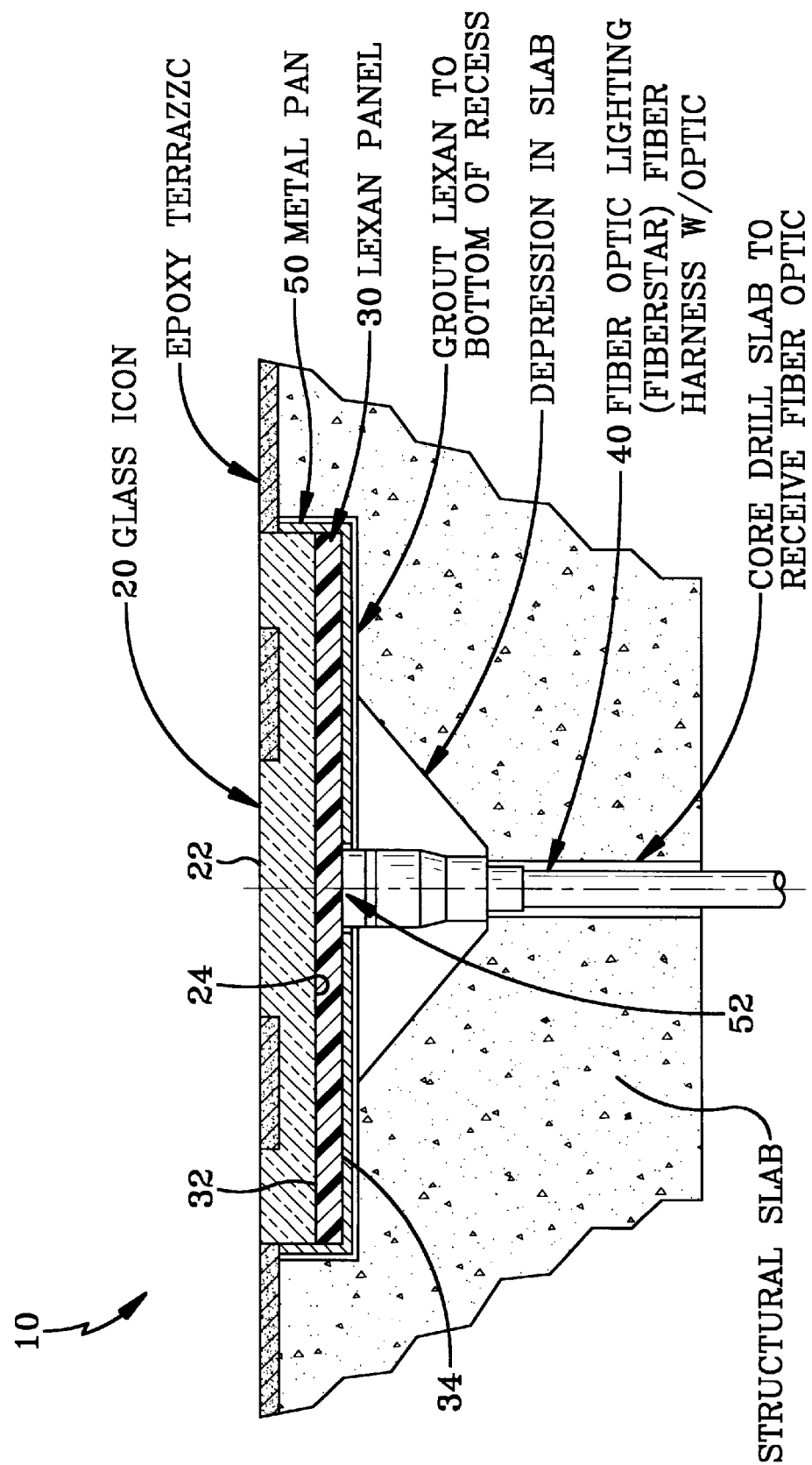
FIG. 1 is a partial cross-sectional view of a preferred embodiment of a lighting display of the present invention.

FIG. 1 illustrates a cross-sectional view of a preferred embodiment of a lighting display of the present invention. This embodiment of the lighting display 10 includes an icon 20, an interface 30, a fiber-optic cable 40, and a light source. As illustrated in FIG. 1, this embodiment of a lighting display 10 is mounted in a terrazzo floor system.

The icon 20 has a top 22 and a bottom 24. The top 22 of the icon 20 may have any desired shape. The icon 20 is adapted to transmit light. For maximum visual effect, it is preferred that the icon 20 is comprised of a transparent material such as glass. However, it should be recognized that the icon 20 may be comprised of a translucent material.

The interface 30 is also adapted to transmit light. The interface 30 has a top 32 and a bottom 34. The top 32 of the interface 30 is secured to the bottom 24 of the icon 20. An adhesive may be used to secure the top 32 of the interface 30 to the bottom 24 of the icon 20. In order to maximize the visual effect of the lighting display 10, a clear epoxy is preferably used which is not visible through the top 22 of the icon 20.

The interface 30 is preferably comprised of an impact-resistant polycarbonate or polymer material which may be drilled and cut. In the embodiment shown in FIG. 1, the interface 30 is comprised of Lexan, a polycarbonate sheet commercially available from the General Electric Company. For maximum aesthetic appeal, it is preferred that the interface 30 is translucent in order to obscure the fiber-optic cable 40. However, the interface 30 may be transparent.

The fiber-optic cable 40 has at least one optical fiber. The at least one optical fiber has an entry end and an exit end. The exit end of the at least one optical fiber is secured to the bottom 34 of the interface 30 such that light may be projected through the interface 30 and the icon 20. A plurality of optical fibers may be needed to adequately light the lighting display 10. In that instance, it is preferred that the exit end of each optical fiber is secured to the bottom 34 of the interface 30. Moreover, it is further preferred that the individual optical fibers are separated and spaced apart in order to evenly distribute light throughout the icon 20.

The exit end of the at least one optical fiber may be secured to the bottom 34 of the interface 30 by any conventional means which does not completely prevent light from emerging from the fiber-optic cable 40. For instance, an adhesive which is preferably clear may be used to secure the exit end of the at least one optical fiber to the bottom 34 of the interface 30. Alternatively, the exit end of the at least one optical fiber may be fused to the bottom 34 of the interface 30.

Another preferred method for securing the exit end of the at least one optical fiber to the bottom 34 of the interface 30 is to first drill a hole in the bottom 34 for the at least one optical fiber. If there is more than one optical fiber, it is preferred to drill a separate hole for each individual optical fiber. The at least one optical fiber may then be inserted into its hole. For additional stability and durability, an adhesive which is preferably clear may be used to further secure the at least one optical fiber in its hole.

After the exit end of the at least one optical fiber is secured to the bottom 34 of the interface 30, the icon 20 and the interface 30 may be seated in a pan 50. An adhesive may be used to secure the icon 20 and the interface 30 in the pan 50. The pan 50 is preferably comprised of metal. In addition, the pan 50 preferably has an opening 52 through which the fiber-optic cable 40 may extend in order to receive light from the light source.

The light source is adapted to project light into the entry end of the fiber-optic cable 40. The light source may be remotely located. Moreover, it is preferred to place the light source in a location which is convenient to access for repair purposes.

FIG. 1 also shows a preferred method of mounting an embodiment of a lighting display 10 in an architectural structure such as a terrazzo floor system. In this method, a recess and a core are formed in a structural slab. The recess and the core may be formed by drilling, grinding, or any other conventional technique. The recess is adapted to receive the icon 20 and the interface 30. On the other hand, the core is adapted to allow the fiber-optic cable 40 to extend through the structural slab from the light source to the bottom 34 of the interface 30.

After the icon 20, the interface 30, and the fiber-optic cable 40 are secured together as described above, the icon 20 and the interface 30 may be placed in the recess. It is preferred to use an adhesive such as a clear epoxy to secure the icon 20 and the interface 30 in the recess. In addition, it is preferred that the top 22 of the icon 20 is substantially flush with the finished surface of the architectural structure.

Figure 3:
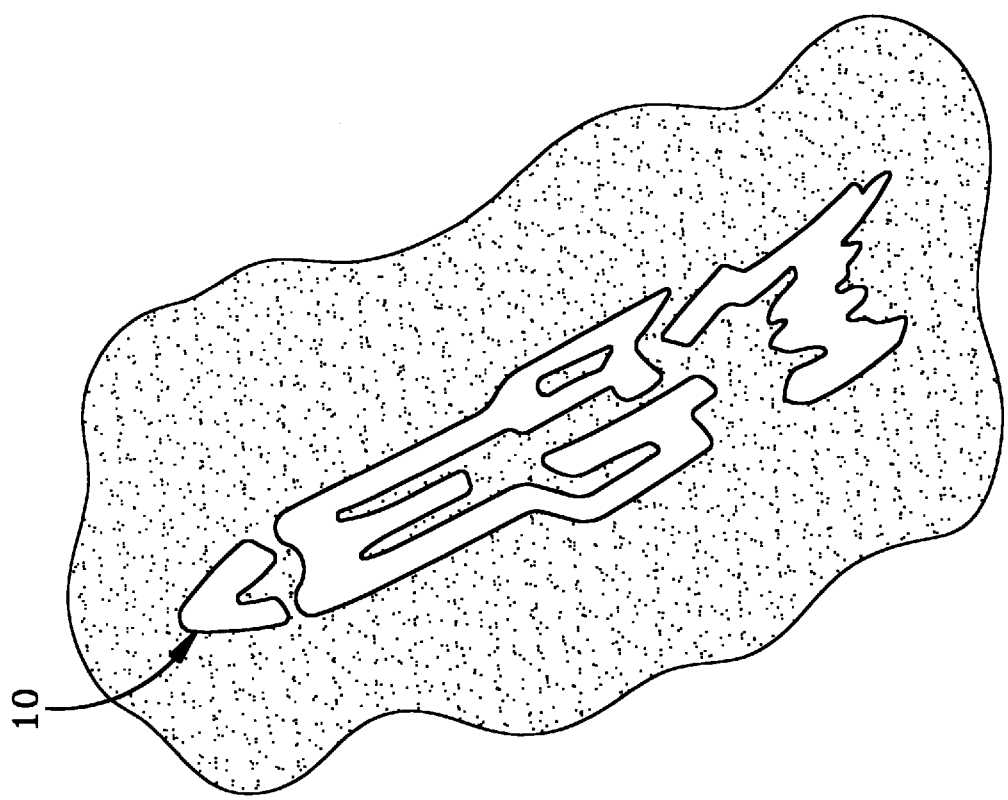
FIG. 3 is a partial perspective view of a preferred embodiment of a lighting display of the present invention mounted in a terrazzo floor.
Figure 2:
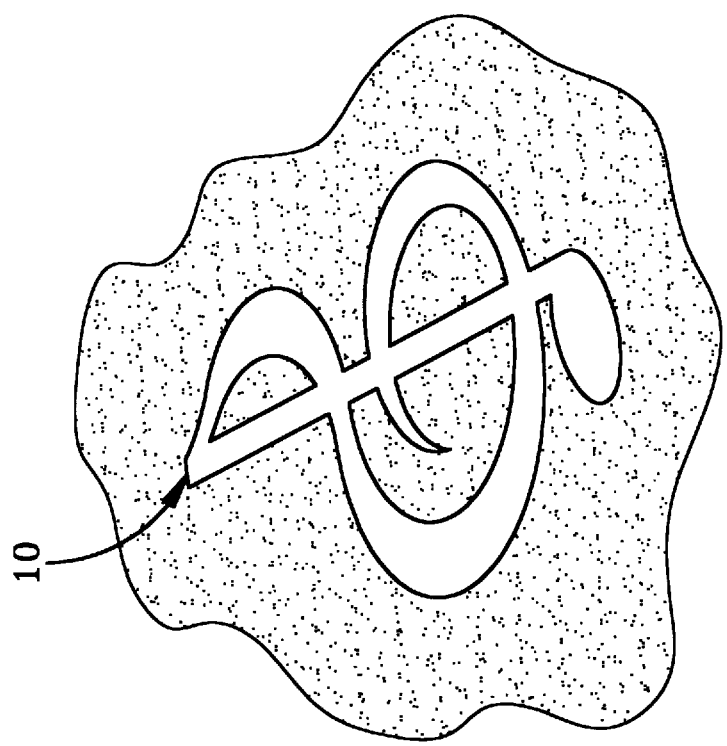
FIG. 2 is a partial perspective view of a preferred embodiment of a lighting display of the present invention mounted in a terrazzo floor.
Figure 4:
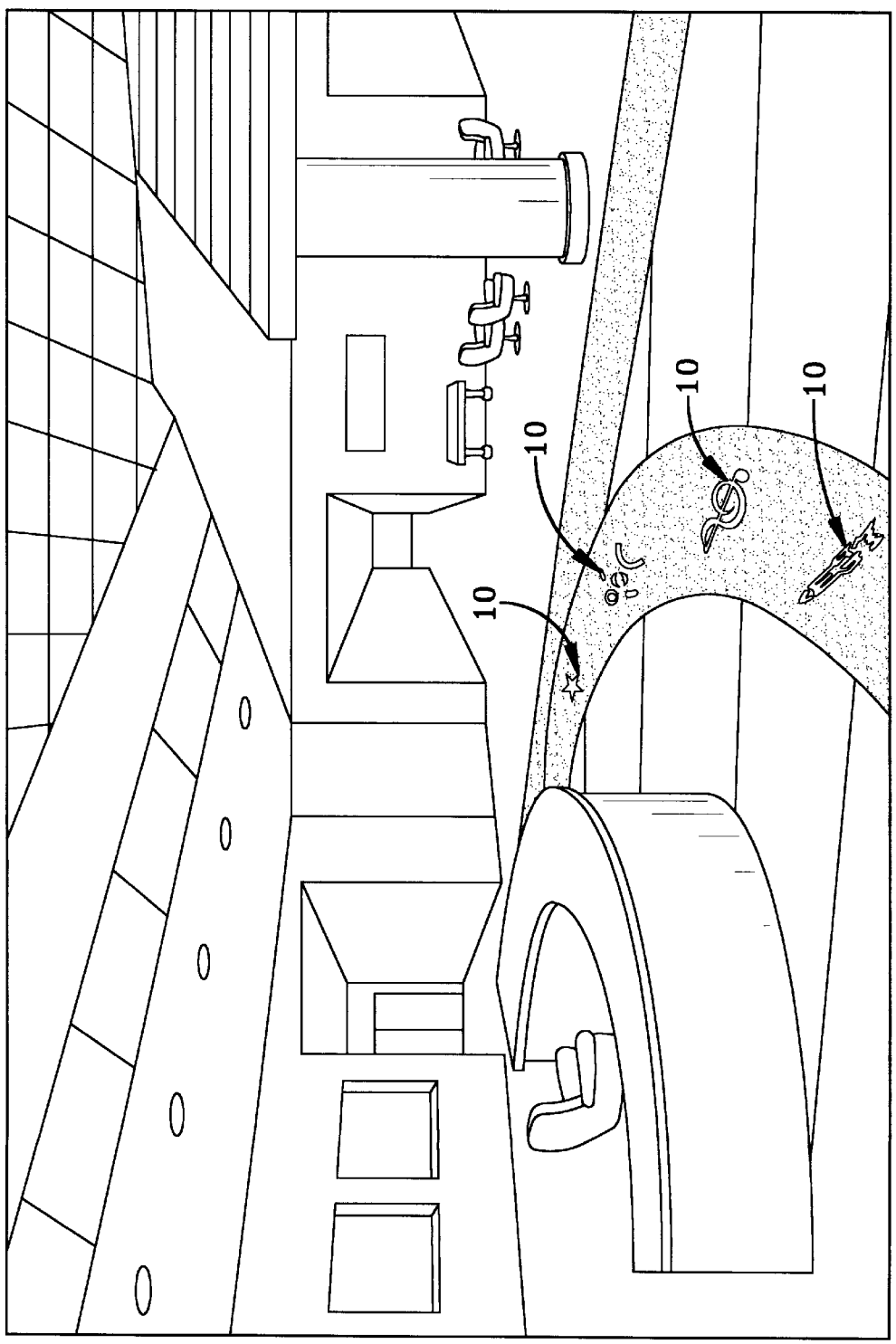
FIG. 4 is a partial perspective view of preferred embodiments of lighting displays of the present invention mounted in a terrazzo floor.

FIGS. 2 through 4 show partial perspective views of preferred embodiments of lighting displays 10 mounted in a terrazzo floor system. For a terrazzo floor system, it is preferred to secure the terrazzo flooring to the structural slab after the icon 20 and the recess 30 are placed in the recess. As shown in FIGS. 1 through 4, the icon 20 may have one or more depressed regions which may be filled by terrazzo flooring. The terrazzo flooring may be secured to a depressed region in the icon 20 by an adhesive.

The preferred embodiments herein disclosed are not intended to be exhaustive or to unnecessarily limit the scope of the invention. The preferred embodiments were chosen and described in order to explain the principles of the present invention so that others skilled in the art may practice the invention. Having shown and described preferred embodiments of the present invention, those skilled in the art will realize that many variations and modifications may be made to affect the described invention. Many of those variations and modifications will provide the same result and fall within the spirit of the claimed invention. It is the intention, therefore, to limit the invention only as indicated by the scope of the claims.

What is claimed is:

1. A floor lighting display comprising:

an icon to be walked on by pedestrian traffic, said icon having a top and a bottom, said icon being made of glass and transmitting light, said top of said icon having at least one raised portion defining the shape of an item to be displayed;

an interface having a top and a bottom, said top of said interface secured directly to said bottom of said icon, said interface being translucent;

a light source; and a fiber-optic cable having at least one optical fiber, said at least one optical fiber having an entry end and an exit end, said entry end of said at least one optical fiber adapted to receive light from said light source, said exit end of said at least one optical fiber secured directly to said bottom of said interface and adapted to project light from said light source through said interface and said icon;

said interface covering covering said exit end of said at least one optical fiber, thereby obscuring said exit end of said at least one optical fiber;

wherein said icon and said interface are mounted in a terrazzo floor system.

2. The lighting display of claim 1 wherein said icon is transparent.

3. The lighting display of claim 1 wherein said icon is translucent.

4. The lighting display of claim 1 wherein said interface is an impact-resistant polycarbonate.

5. The lighting display of claim 1 wherein said interface is an impact-resistant polymer.

6. The lighting display of claim 1 wherein said exit end of said at least one optical fiber is secured to said bottom of said interface by an adhesive.

7. The lighting display of claim 1 wherein said exit end of said at least one optical fiber is fused to said bottom of said interface.

8. The lighting display of claim 1 wherein:

said bottom of said interface defines at least one hole that extends partially through said interface; and said exit end of said at least one optical fiber is secured to said bottom of said interface by inserting said exit end of said at least one optical fiber into said at least one hole defined by said bottom of said interface.

9. The lighting display of claim 8 wherein an adhesive secures said exit end of said at least one optical fiber in said at least one hole defined by said bottom of said interface.

10. A method for making a floor lighting display comprising:

providing an icon in position to be walked on by pedestrian traffic, said icon having a top and a bottom, said icon being made of glass and adapted to transmit light, said top of said icon having at least one raised portion defining the shape of an item to be displayed;

providing an interface having a top and a bottom, said interface being translucent;

securing said top of said interface directly to said bottom of said icon;

providing a fiber-optic cable having at least one optical fiber, said at least one optical fiber having an entry end and an exit end;

securing said exit end of said at least one optical fiber directly to said bottom of said interface; and projecting light into said entry end of said at least one optical fiber;

light emerging from said exit end of said at least one optical fiber and being transmitted through said interface and said icon, said interface covering said exit end of said at least one optical fiber, thereby obscuring said exit end of said at least one optical fiber.

11. The method of claim 10 further comprising mounting said icon and said interface in a terrazzo floor system.

12. The method of claim 10 wherein said icon is transparent.

13. The method of claim 10 wherein said exit end of said at least one optical fiber is secured to said bottom of said interface by an adhesive.

14. The method of claim 10 wherein said exit end of said at least one optical fiber is fused to said bottom of said interface.

15. The method of claim 10 wherein:

said bottom of said interface defines at least one hole that extends partially through said interface; and said exit end of said at least one optical fiber is secured to said bottom of said interface by inserting said exit end of said at least one optical fiber into said at least one hole defined by said bottom of said interface.

16. The method of claim 15 wherein an adhesive secures said exit end of said at least one optical fiber in said at least one hole defined by said bottom of said interface.

* * * * *